(12) United States Patent
Etchegoyen

(10) Patent No.: US 8,495,359 B2
(45) Date of Patent: Jul. 23, 2013

(54) SYSTEM AND METHOD FOR SECURING AN ELECTRONIC COMMUNICATION

(75) Inventor: Craig Stephen Etchegoyen, Irvine, CA (US)

(73) Assignee: NetAuthority, San Francisco, CA (US)

( * ) Notice: Subject to any disclaimer, the term of this patent is extended or adjusted under 35 U.S.C. 154(b) by 0 days.

(21) Appl. No.: 12/792,249

(22) Filed: Jun. 2, 2010

(65) Prior Publication Data

US 2010/0325423 A1    Dec. 23, 2010

Related U.S. Application Data

(60) Provisional application No. 61/219,062, filed on Jun. 22, 2009.

(51) Int. Cl.
*G06F 21/00* (2006.01)

(52) U.S. Cl.
USPC .............. 713/153; 380/44; 380/258; 726/11; 726/26; 709/229; 709/242

(58) Field of Classification Search
USPC ................................................ 713/153, 155
See application file for complete search history.

(56) References Cited

U.S. PATENT DOCUMENTS

| | | | |
|---|---|---|---|
| 4,200,770 A | 4/1980 | Hellman et al. | |
| 4,323,921 A | 4/1982 | Guillou | |
| 4,337,483 A | 6/1982 | Guillou | |
| 4,351,982 A | 9/1982 | Miller et al. | |
| 4,405,829 A | 9/1983 | Rivest et al. | |
| 4,450,535 A | 5/1984 | de Pommery et al. | |
| 4,658,093 A | 4/1987 | Hellman | |
| 4,704,610 A | 11/1987 | Smith et al. | |
| 4,796,220 A | 1/1989 | Wolfe | |
| 5,191,611 A | 3/1993 | Lang | |
| 5,210,795 A | 5/1993 | Lipner et al. | |
| 5,239,648 A | 8/1993 | Nukui | |
| 5,291,598 A | 3/1994 | Grundy | |

(Continued)

FOREIGN PATENT DOCUMENTS

| | | |
|---|---|---|
| AU | 678985 | 6/1997 |
| EP | 1637958 | 3/2006 |

(Continued)

OTHER PUBLICATIONS

The Secure Shell (SSH) Authentication Protocol|http://tools.ietf.org/pdf/rfc4252.pdf|Jan. 2006|T. Ylonen and C. Lonvick|.*

(Continued)

*Primary Examiner* — Mahfuzur Rahman
(74) *Attorney, Agent, or Firm* — Sean D. Burdick

(57) ABSTRACT

A system for securing an electronic communication comprises a gateway server configured to receive and store a device identifier and a network address from a first computing device. The device identifier identifies the first computing device, and the network address is associated with the first computing device. Thereafter, the gateway server receives from a second computing device the network address of the first computing device and an encryption key request. The gateway server derives from the device identifier for the first computing device an encryption key and sends the encryption key to the second computing device. A communication from the second computing device to the first computing device may thereafter be secured using the encryption key. A related method of securing an electronic communication is also disclosed.

15 Claims, 3 Drawing Sheets

U.S. PATENT DOCUMENTS

| | | | |
|---|---|---|---|
| 5,313,637 | A | 5/1994 | Rose |
| 5,349,643 | A | 9/1994 | Cox et al. |
| 5,414,269 | A | 5/1995 | Takahashi |
| 5,418,854 | A | 5/1995 | Kaufman et al. |
| 5,440,635 | A | 8/1995 | Bellovin et al. |
| 5,490,216 | A | 2/1996 | Richardson, III |
| 5,666,415 | A | 9/1997 | Kaufman |
| 5,745,879 | A | 4/1998 | Wyman |
| 5,754,763 | A | 5/1998 | Bereiter |
| 5,790,664 | A | 8/1998 | Coley et al. |
| 5,925,127 | A | 7/1999 | Ahmad |
| 5,974,150 | A | 10/1999 | Kaish et al. |
| 6,009,401 | A | 12/1999 | Horstmann |
| 6,044,471 | A | 3/2000 | Colvin |
| 6,098,053 | A | 8/2000 | Slater |
| 6,098,106 | A | 8/2000 | Philyaw et al. |
| 6,158,005 | A | 12/2000 | Bharathan et al. |
| 6,163,843 | A * | 12/2000 | Inoue et al. ............... 726/11 |
| 6,230,199 | B1 | 5/2001 | Revashetti et al. |
| 6,233,567 | B1 | 5/2001 | Cohen |
| 6,243,468 | B1 | 6/2001 | Pearce et al. |
| 6,294,793 | B1 | 9/2001 | Brunfeld et al. |
| 6,330,670 | B1 | 12/2001 | England et al. |
| 6,449,645 | B1 | 9/2002 | Nash |
| 6,536,005 | B1 | 3/2003 | Augarten |
| 6,681,017 | B1 * | 1/2004 | Matias et al. .............. 380/277 |
| 6,785,825 | B2 | 8/2004 | Colvin |
| 6,859,793 | B1 | 2/2005 | Lambiase |
| 6,880,079 | B2 * | 4/2005 | Kefford et al. ............. 713/155 |
| 6,920,567 | B1 | 7/2005 | Doherty et al. |
| 6,976,009 | B2 | 12/2005 | Tadayon et al. |
| 7,032,110 | B1 | 4/2006 | Su et al. |
| 7,032,242 | B1 * | 4/2006 | Grabelsky et al. ............ 726/11 |
| 7,069,440 | B2 | 6/2006 | Aull |
| 7,069,595 | B2 | 6/2006 | Cognigni et al. |
| 7,085,741 | B2 | 8/2006 | Lao et al. |
| 7,188,241 | B2 | 3/2007 | Cronce et al. |
| 7,203,966 | B2 | 4/2007 | Abburi et al. |
| 7,206,765 | B2 | 4/2007 | Gilliam et al. |
| 7,272,728 | B2 | 9/2007 | Pierson et al. |
| 7,310,813 | B2 | 12/2007 | Lin et al. |
| 7,319,987 | B1 | 1/2008 | Hoffman et al. |
| 7,327,280 | B2 | 2/2008 | Bachelder et al. |
| 7,337,147 | B2 | 2/2008 | Chen et al. |
| 7,343,297 | B2 | 3/2008 | Bergler et al. |
| 7,444,508 | B2 | 10/2008 | Karjala et al. |
| 7,463,945 | B2 | 12/2008 | Kiesel et al. |
| 7,506,056 | B2 | 3/2009 | Satish et al. |
| 7,552,233 | B2 * | 6/2009 | Raju et al. ............... 709/238 |
| 7,599,303 | B2 | 10/2009 | Nadeau et al. |
| 7,653,899 | B1 | 1/2010 | Lindahl et al. |
| 7,739,401 | B2 | 6/2010 | Goyal |
| 7,739,402 | B2 | 6/2010 | Roese |
| 7,818,573 | B2 | 10/2010 | Martin et al. |
| 7,852,861 | B2 | 12/2010 | Wu et al. |
| 7,870,273 | B2 * | 1/2011 | Watson et al. ............ 709/229 |
| 8,023,484 | B1 * | 9/2011 | Huang et al. ............. 370/338 |
| 2001/0034712 | A1 | 10/2001 | Colvin |
| 2001/0044782 | A1 | 11/2001 | Hughes et al. |
| 2002/0010864 | A1 | 1/2002 | Safa |
| 2002/0019814 | A1 | 2/2002 | Ganesan |
| 2002/0082997 | A1 | 6/2002 | Kobata et al. |
| 2002/0099952 | A1 | 7/2002 | Lambert et al. |
| 2002/0161718 | A1 | 10/2002 | Coley et al. |
| 2003/0063750 | A1 | 4/2003 | Medvinsky et al. |
| 2003/0065918 | A1 | 4/2003 | Willey |
| 2003/0070067 | A1 * | 4/2003 | Saito ....................... 713/150 |
| 2003/0131001 | A1 | 7/2003 | Matsuo |
| 2003/0149777 | A1 | 8/2003 | Adler |
| 2003/0172035 | A1 | 9/2003 | Cronce et al. |
| 2003/0182435 | A1 | 9/2003 | Redlich et al. |
| 2003/0212892 | A1 * | 11/2003 | Oishi ...................... 713/168 |
| 2003/0217263 | A1 | 11/2003 | Sakai |
| 2003/0237004 | A1 | 12/2003 | Okamura |
| 2004/0024860 | A1 | 2/2004 | Sato et al. |
| 2004/0030912 | A1 | 2/2004 | Merkle et al. |
| 2004/0059929 | A1 | 3/2004 | Rodgers et al. |
| 2004/0143746 | A1 | 7/2004 | Ligeti et al. |
| 2004/0145773 | A1 | 7/2004 | Oakeson et al. |
| 2004/0187018 | A1 | 9/2004 | Owen et al. |
| 2005/0033957 | A1 | 2/2005 | Enokida |
| 2005/0108173 | A1 | 5/2005 | Stefik et al. |
| 2005/0138155 | A1 | 6/2005 | Lewis |
| 2005/0169271 | A1 | 8/2005 | Janneteau et al. |
| 2005/0172280 | A1 | 8/2005 | Ziegler et al. |
| 2005/0187890 | A1 | 8/2005 | Sullivan |
| 2005/0223218 | A1 * | 10/2005 | Honkanen et al. ............ 713/155 |
| 2006/0072444 | A1 | 4/2006 | Engel et al. |
| 2006/0095454 | A1 | 5/2006 | Shankar et al. |
| 2006/0130135 | A1 | 6/2006 | Krstulich et al. |
| 2006/0161914 | A1 | 7/2006 | Morrison et al. |
| 2006/0168253 | A1 * | 7/2006 | Baba et al. ................. 709/229 |
| 2006/0265337 | A1 | 11/2006 | Wesinger, Jr. |
| 2006/0271485 | A1 | 11/2006 | McKenzie et al. |
| 2006/0280207 | A1 | 12/2006 | Guarini et al. |
| 2006/0282511 | A1 | 12/2006 | Takano et al. |
| 2007/0005974 | A1 * | 1/2007 | Kudou ..................... 713/171 |
| 2007/0055853 | A1 | 3/2007 | Hatasaki et al. |
| 2007/0168288 | A1 | 7/2007 | Bozeman |
| 2007/0198422 | A1 | 8/2007 | Prahlad et al. |
| 2007/0203846 | A1 | 8/2007 | Kavuri et al. |
| 2007/0219917 | A1 | 9/2007 | Liu et al. |
| 2007/0282615 | A1 | 12/2007 | Hamilton et al. |
| 2008/0040785 | A1 | 2/2008 | Shimada |
| 2008/0049779 | A1 * | 2/2008 | Hopmann et al. .............. 370/431 |
| 2008/0052775 | A1 | 2/2008 | Sandhu et al. |
| 2008/0065552 | A1 | 3/2008 | Elazar et al. |
| 2008/0076572 | A1 | 3/2008 | Nguyen et al. |
| 2008/0082813 | A1 | 4/2008 | Chow et al. |
| 2008/0086423 | A1 | 4/2008 | Waites |
| 2008/0098471 | A1 | 4/2008 | Ooi et al. |
| 2008/0147556 | A1 | 6/2008 | Smith et al. |
| 2008/0148067 | A1 * | 6/2008 | Sitrick et al. ................ 713/193 |
| 2008/0152140 | A1 * | 6/2008 | Fascenda ................... 380/258 |
| 2008/0177997 | A1 * | 7/2008 | Morais et al. ............... 713/153 |
| 2008/0228578 | A1 | 9/2008 | Mashinsky |
| 2008/0244739 | A1 | 10/2008 | Liu et al. |
| 2008/0298595 | A1 * | 12/2008 | Narayanan et al. ........... 380/278 |
| 2008/0320607 | A1 | 12/2008 | Richardson |
| 2009/0003600 | A1 | 1/2009 | Chen et al. |
| 2009/0006861 | A1 | 1/2009 | Ven Bemmel |
| 2009/0016264 | A1 | 1/2009 | Hirano et al. |
| 2009/0083730 | A1 | 3/2009 | Richardson |
| 2009/0113088 | A1 | 4/2009 | Illowsky et al. |
| 2009/0138975 | A1 | 5/2009 | Richardson |
| 2009/0158426 | A1 | 6/2009 | Yoon et al. |
| 2010/0034207 | A1 * | 2/2010 | Mcgrew et al. .............. 370/401 |
| 2010/0197326 | A1 * | 8/2010 | Ngo ....................... 455/466 |
| 2010/0235624 | A1 * | 9/2010 | Candelore ................. 713/155 |

FOREIGN PATENT DOCUMENTS

| | | |
|---|---|---|
| EP | 1637961 | 3/2006 |
| EP | 1670188 | 6/2006 |
| WO | WO 9220022 | 11/1992 |
| WO | WO 9301550 | 1/1993 |
| WO | WO 9535533 | 12/1995 |
| WO | WO 0067095 | 11/2000 |
| WO | WO 01/09756 | 2/2001 |
| WO | WO 2005104686 | 11/2005 |
| WO | WO2007060516 | 5/2007 |
| WO | WO2008013504 | 1/2008 |
| WO | WO 2008/034900 | 3/2008 |
| WO | WO 2008/052310 | 5/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |

OTHER PUBLICATIONS

Optimizing Public-Key Encryption for Wireless Clients|http://palms.ee.princeton.edu/PALMSopen/potlapally02optimizing.pdf|Potlapally et al.|2002|pp. 1-7.*

Williams, R., "A Painless Guide to CRC Error Detection Algorithms", Ver. 3, Aug. 19, 1993.

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Eisen, Ori, "Catching the Fraudulent Man-in-the-Middle and Man-in-the-Browser," *Network Security*, Apr. 2010, pp. 11-12.

Housley et al., "Internet x.509 Public Key Infracstructure Certificate and CRL Profile," *The Internet Society*, Network Working Group, Sep. 1999, 75 pages [RFC 2459].

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Nesi, et al., "A Protection Processor for MPEG-21 Players," In Proceedings of ICME, 2006, pp. 1357-1360.

Zhu, Yunpu, "A New Architecture for Secure Two-Party Mobile Payment Transactions," Submitted to the School of Graduate Studies of the University of Lethbridge, Master of Science, 2010, 240 pages. FC 4252 The Secure Shell, Authentication Protocol, Print Publication, Jan. 2006.

\* cited by examiner

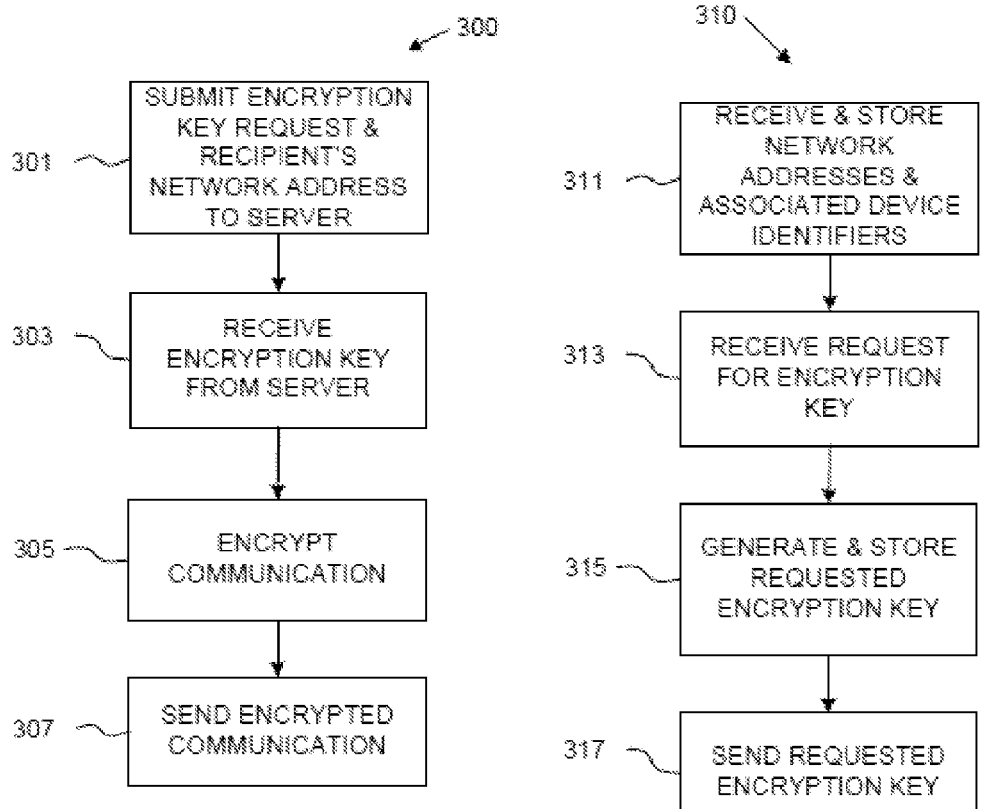

SYSTEM AND METHOD FOR SECURING AN ELECTRONIC COMMUNICATION

This application claims priority to U.S. Provisional Application Ser. No. 61/219,062 which was filed Jun. 22, 2009 and which is fully incorporated herein by reference.

BACKGROUND

1. Field of the Invention

The field of the present invention is systems and methods for securely sending a digital document between computing devices.

2. Description of the Related Art

As electronic commerce and communications become ever more prevalent within society, it is becoming increasingly important that electronic communications are not only secure, but also that they are received and made available only to the intended recipient. To a great extent, encryption technologies, whether public-private key encryption and symmetric key encryption, have enabled secure communications. However, while these encryption technologies aid in ensuring that the communication is secure during transit, neither is very capable of verifying that the actual recipient is decrypting the communication. Essentially, anyone who possesses the encryption key is capable of decrypting the communication. Increasing the likelihood that it is the recipient who decrypts the message, and not an unwanted third party, is therefore desirable.

SUMMARY OF THE INVENTION

The present invention is directed toward a system and method for securing an electronic communication. The electronic communication is sent from a first computing device to a second computing device, and through interactions with a gateway server, the first computing device obtains an encryption key which is used to encrypt the electronic communication. The second computing device, upon receipt of the encrypted electronic communication, decrypts the encrypted electronic communication.

In a first separate aspect of the present invention, with respect to the system, the gateway server receives and stores a device identifier and a network address from the first computing device. The device identifier identifies and the network address is associated with the first computing device. Thereafter, when the gateway server receives a request for an encryption key, along with the network address of the first computing device, from a second computing device, the gateway server derives the encryption key from the device identifier for the first computing device. The generated encryption key is then sent to the second computing device, which may use the encryption key to secure an electronic communication with the first computing device.

In a second separate aspect of the present invention, building upon the first separate aspect, the gateway server may give confirmation to the first computing device, upon request therefrom, that the encryption key was provided to the second computing device.

In a third separate aspect of the present invention, building upon the first separate aspect, the encryption key sent to the second computing device may be a public encryption key, and the first computing device may decrypt the encrypted electronic communication by deriving the private encryption key from the device identifier previously sent to the gateway server. Alternatively, the two encryption keys may be the same.

In a fourth separate aspect of the present invention, with respect to the method, the gateway server receives and stores a device identifier and a network address from a first computing device. The device identifier identifies and the network address is associated with the first computing device. The gateway server receives from a second computing device the network address of the first computing device along with a request for an encryption key. In response, the gateway server derives the encryption key from the device identifier for the first computing device and sends the encryption key to the second computing device. Thereafter, the second computing device may use the encryption key to secure an electronic communication with the first computing device.

In a fifth separate aspect of the present invention, any of the foregoing aspects may be employed in combination. Aspects indicated for the system may be incorporated into the method, just as aspects indicated for the method may be incorporated into the system.

Accordingly, an improved system and method for securing an electronic communication are disclosed. Advantages of the improvements will appear from the drawings and the description of the preferred embodiment.

BRIEF DESCRIPTION OF THE DRAWINGS

In the drawings, wherein like reference numerals refer to similar components:

FIGS. 3A-3C are flowcharts illustrating a process for securely sending and receiving an electronic communication.

DETAILED DESCRIPTION

Figure 1:
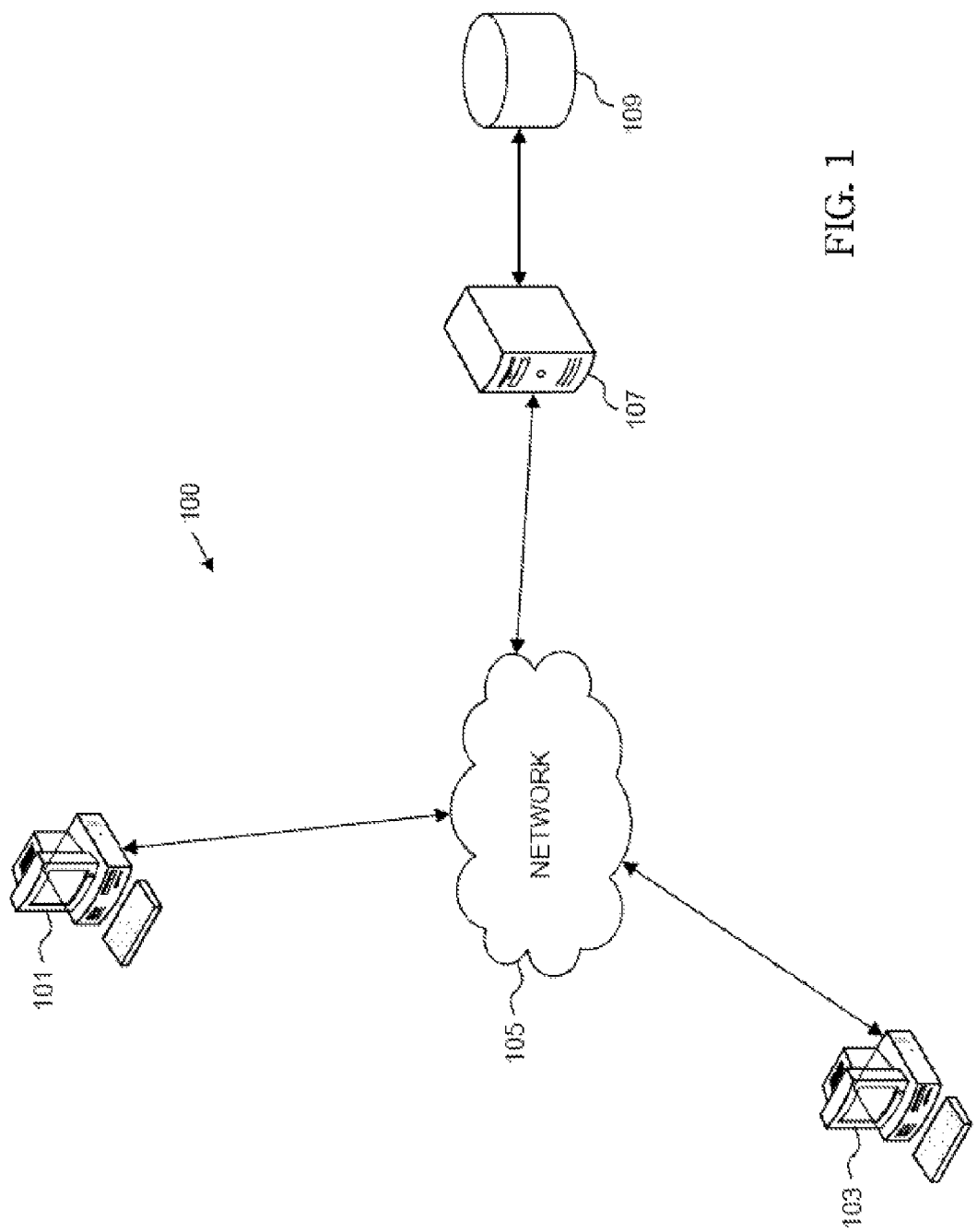
FIG. 1 schematically illustrates a system for securing an electronic communication.

Turning in detail to the drawings, FIG. 1 illustrates a system which is arranged to enable secure communications between the first computing device 101 and the second computing device 103 via the network 105. Hereinafter, each computing device 101, 103 will be referred to as a "computer", even though each may be any machine or device capable of communication with a computer network, such as a game console, a personal computer, a server computer, a laptop computer, a tablet computer, a personal digital assistant, a mobile phone, a wireless communication device, an onboard vehicle computer, and the like. Moreover, each computer 101, 103 includes one or more applications, or other programmed code, which is configured to perform the functionality described below.

Both computers 101, 103 may communicate over the network 105 with at least each other and a gateway server 107, which is also communicably connected to the network 105. When not communicating in a manner as disclosed herein, such communications may be in the clear or secured through any desired encryption technique. The communication links between the network, on the one hand, and the computers 101, 103 and the gateway server 107, on the other hand, may take any form desired. For example, any of the communication links may be established through intermediaries such as a private communications network or over a public communications network, the Internet being an example of the latter. Alternatively, a private communications network, a public communications network, or any combination of one or more of such networks may form the network 105. Also, any of the communication links may be established directly or indirectly, permanent or transitory, wired or wireless. In some instances, the communication links may be established as needed.

To achieve a secure communication between the two computers 101, 103, at least one of the two, the one to receive the secure communication, communicates with the server 107 to provide information that enables the secure communication. The information provided to the server includes the network address associated with and a device identifier for the receiving computer. The server 107 receives the information and stores it within the database 109 for later access as needed. The database 109 may reside on the server 107, or it may reside on another computing device that is communicatively connected with the server 107. With such a system, the database becomes populated with network addresses and device identifiers for as many computing devices as may be on a particular network, or as may desire to take advantage of the ability to send and receive secure communications as discussed herein.

The network address may be any identifier by which the receiving computer is represented on the network. The network address may also be any combination of information sufficient to represent or identify the receiving computer on the network, depending upon the type of network connecting the computers. The type of information used and or needed as the network address will depend upon the type of network connecting the two computers. For example, the network address may be any one or more of an email address, an Internet Protocol (IP) address, and/or a Media Access Control (MAC) address. For certain wide area networks (WANs), an email address or MAC address may be sufficient to identify the receiving computer on the network. For other types of WANs, a combination of an email address and a MAC address may be sufficient. As another example, when the network is viewed as the Internet, an IP address may be sufficient.

An application is included on each computer 103, 105 to collect information about each respective computing device and to generate the device identifier for each computer 103, 105. This application may be incorporated as a function or routine as part of another application, or as part of the operating system, to be called upon and run as needed. The application checks and gathers a number of parameters which, collectively, are expected to uniquely identify the individual computing devices. The parameters checked may include, for example, hard disk volume name, user name, device name, user password, hard disk initialization date, etc. The collected information includes information that identifies the hardware on which the application is used, such as, for example, CPU number, or unique parameters associated with the firmware in use. The system information may further include system configuration information, such as amount of memory, type of processor, software or operating system serial number, etc. The parameters checked may also include, alternatively or in addition, virtual machine specifications. Examples of virtual machine specifications include, but are not limited to, information relating to virtual processors, virtual BIOS, virtual memory, virtual graphics, virtual IDE drives, virtual SCSI devices, virtual PCI slots, virtual floppy drives, virtual serial (COM) ports, virtual parallel (LPT) ports, virtual keyboard, virtual mouse and drawing tablets, virtual Ethernet card, virtual networking, virtual sound adapter, etc.

Based on the information collected from the computing device, the application generates a device identifier that uniquely identifies the user's computer. The device identifier may be stored in a hidden directory of the device, and/or it may be generated each time prior to the occurrence of a data transmission, or at any other desired time. The device identifier, by virtue of the application being used on the computing device or otherwise having access to the computing device's hardware and file system, is generated by a process which operates on data indicative of the computing device's configuration and hardware.

The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters.

The application that generates the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured device identifier application operating or otherwise having had access to the same computing device for which the device identifier was first generated. Conversely, each identifier, again to a very high degree of certainty, can be successfully reproduced by the suitably configured device identifier application operating or otherwise having access to the same computing device on which the identifier was first generated.

The device identifier application may operate by performing a system scan to determine a present configuration of the computing device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

In one example, the device identifier may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Figure 2:
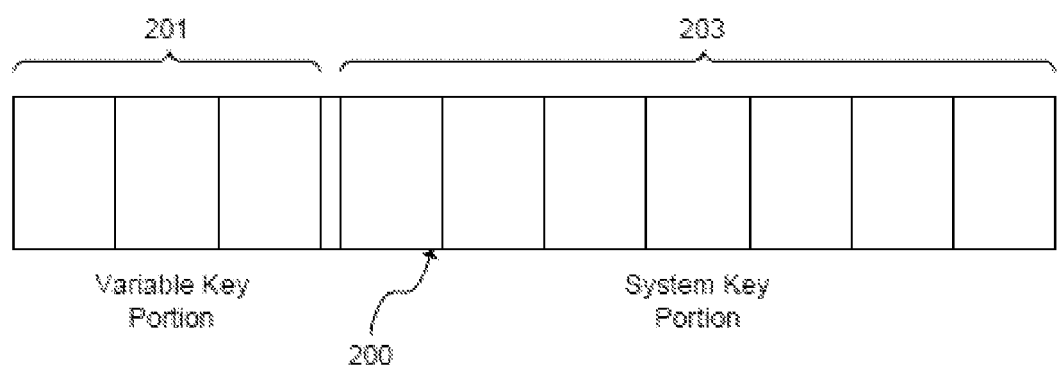
FIG. 2 schematically illustrates the components of a device identifier.

FIG. 2 illustrates an exemplary embodiment of a device identifier 200, which may include two components—namely, a variable key portion 201 and a system key portion 203. The variable key portion 201 may be generated by reference to a variable platform parameter, such as via reference to system time information, although other parameters which are variable may be utilized in other embodiments. The system key portion 203 may include the above described parameters expected to be unique to the computing device on which the application is used, such as, for example, hard disk volume name, user name, computer name, user password, hard disk initialization date, or combinations of the parameters described above. The variable key portion 201 and/or the system key portion 203 may be combined with the IP address and/or other platform parameters of the computing device. The device identifier, or portions thereof, may be encrypted to add an additional layer of specificity and security.

FIGS. 3A-3C illustrate the processes that occur on the computers 101, 103 and on the server 107 to enable secure communications between the two computers 101, 103. For this example, the first computer 101 is the recipient computer, and the second computer 103 is the sending computer. FIG. 3A shows the processes 300 by which the sending computer prepares and transmits a secure communication to the recipient computer. The first step of this transmission process is to submit 301 a request for an encryption key, along with the recipient computer's network address, to the gateway server. Presuming the gateway server has the recipient computer's network address and device identifier stored within the database, the sending computer receives 303 the encryption key from the gateway server. As discussed below, the gateway server derives this encryption key from the device identifier for the recipient computer. Following receipt 303 of the encryption key, the sending computer encrypts 305 the communication and sends 307 the encrypted communication over the network to the recipient computer.

FIG. 3B shows the process 310 by which the server 107 interacts with the two computers 101, 103. Initially, the server 107 receives and stores 311 the network addresses and device identifiers provided by various computers within the database. Upon receiving a request 313 for an encryption key for a particular recipient computer, the server checks to ensure that records for that recipient computer exist within the database, then generates and stores 315 the requested encryption key if it is not already stored within the database. Optionally, the encryption key need not be stored and may be regenerated upon subsequent requests. The encryption key is generated using the device identifier for the recipient computer, and may be generated using any desired cryptographic technique. Further, the encryption key may be a symmetric key, or it may be the public key portion of a public key-private key pair. Techniques for generating encryption keys are well known to those of skill in the art of cryptography, and as such are not discussed in further detail herein. Following generation 315 (or retrieval from the database) of the encryption key, the server 107 sends the requested encryption key to the sending computer. As an additional option, the server 107 may provide confirmations to the receiving computer that the sending computer requested and was sent the encryption key. Such confirmation aids in building trust that the communication actually originated from the sending computer.

FIG. 3C shows the process 320 by which the receiving computer receives and decrypts the secure communication. Following receipt 321 of the encrypted communication, the receiving computer generates 323 an encryption key using its own device identifier, and with this encryption key, the receiving computer decrypts 325 the communication. The technique used by the receiving computer to generate the encryption key is the same as that used by the server. In the event that symmetric key encryption is used, then the encryption key generated by the receiving computer is the same as the encryption key generated by the server and sent to the sending computer. In the event that asymmetric key encryption is used, then the encryption key generated by the receiving computer is the private key part of a public key-private key pair. As is mentioned above, the receiving computer may also take the additional step of querying the server to determine if the computer purporting to send the secure communication, i.e., the sending computer, did, in fact, request the encryption key.

Thus, a system and method for securing an electronic communication are disclosed. While embodiments of this invention have been shown and described, it will be apparent to those skilled in the art that many more modifications are possible without departing from the inventive concepts herein. The invention, therefore, is not to be restricted except in the spirit of the following claims.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A system for securing an electronic communication, the system comprising:
a gateway server configured to:
receive and store a device identifier and a network address from a first computing device, wherein the device identifier is generated by the first computing device from a combination of user-configurable and non-user-configurable parameters of the first computing device and uniquely identifies the first computing device, and wherein the network address is associated with the first computing device;
receive from a second computing device the network address for the first computing device and an encryption key request;
derive an encryption key from the device identifier for the first computing device;
send the encryption key to the second computing device, and
confirm to the first computing device that the encryption key was requested by the second computing device and was sent to the second computing device.

2. The system of claim 1, wherein the gateway server is further configured to receive and store a second device identifier and a second network address from the second computing device.

3. The system of claim 1, wherein the network address comprises at least one of an email address, an Internet Protocol (IP) address, and a Media Access Control (MAC) address.

4. The system of claim 1, wherein the network address resolves to at least one of an IP address, a MAC address, and an e-mail address.

5. The system of claim 1, wherein the encryption key is a public encryption key.

6. A method of securing an electronic communication, the method comprising:

receiving and storing at a gateway server store a device identifier and a network address from a first computing device, wherein the device identifier is generated by the first computing device from a combination of user-configurable and non-user-configurable parameters of the first computing device and uniquely identifies the first computing device, and wherein the network address is associated with the first computing device;

receiving from a second computing device the network address for the first computing device and an encryption key request;

deriving from the device identifier an encryption key for the first computing device;

sending the encryption key to the second computing device; and confirming to the first computing device that the encryption key was requested by the second computing device and was sent to the second computing device.

7. The method of claim 6, further comprising receiving and storing a second device identifier and a second network address from the second computing device.

8. The method of claim 6, further comprising confirming to the first computing device that the encryption key was sent to the second computing device.

9. The method of claim 6, wherein the network address comprises at least one of an email address, an Internet Protocol (IP) address, and a Media Access Control (MAC) address.

10. The method of claim 6, wherein the network address resolves to at least one of an IP address, a MAC address, and an email address.

11. A method of receiving a secured electronic communication, the method comprising:

providing from a recipient computing device to a gateway server a network address and a device identifier for the recipient computing device, the device identifier generated by the recipient computing device from a combination of user-configurable and non-user-configurable parameters of the recipient computing device and uniquely identifying the recipient computing device;

receiving at the recipient computing device the secured electronic communication, wherein the secured electronic communication is encrypted by a sending computing device with a first encryption key derived from the device identifier by the gateway server;

querying, by the recipient computing device, the gateway server for confirmation that the sending computing device requested the first encryption key;

generating at the recipient computing device a second encryption key from the device identifier; and decrypting at the recipient computing device the secured electronic communication using the second encryption key.

12. The method of claim 11, further comprising the recipient computing device communicating with the gateway server that the gateway server provided the first encryption key to the sending computing device.

13. The method of claim 11, wherein the network address comprises at least one of an email address, an Internet Protocol (IP) address, and a Media Access Control (MAC) address.

14. The method of claim 11, wherein the network address resolves to at least one of an IP address, a MAC address, and an email address.

15. The method of claim 11, wherein the first encryption key is different from the second encryption key.

* * * * *